US009087245B2

(12) United States Patent
Murakami et al.

(10) Patent No.: US 9,087,245 B2
(45) Date of Patent: Jul. 21, 2015

(54) PORTABLE TERMINAL AND COMPUTER PROGRAM FOR LOCATING OBJECTS WITH RFID TAGS BASED ON STORED POSITION AND DIRECTION DATA

(75) Inventors: Bungo Murakami, Koganei (JP); Masaki Fujimoto, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 448 days.

(21) Appl. No.: 13/426,340

(22) Filed: Mar. 21, 2012

(65) Prior Publication Data

US 2012/0242457 A1    Sep. 27, 2012

(30) Foreign Application Priority Data

Mar. 23, 2011    (JP) .................................. 2011-063479

(51) Int. Cl.
*G06K 7/01* (2006.01)
*G06K 7/10* (2006.01)
*G06Q 10/08* (2012.01)

(52) U.S. Cl.
CPC .......... *G06K 7/10099* (2013.01); *G06Q 10/087* (2013.01)

(58) Field of Classification Search
CPC .......... G06K 7/10079; G06K 7/10089; G06K 7/10099; G06Q 10/087
USPC ................................ 235/385; 340/10.1, 572.1
See application file for complete search history.

(56) References Cited

U.S. PATENT DOCUMENTS

| | | | | |
|---|---|---|---|---|
| 6,094,625 | A | * | 7/2000 | Ralston .......................... 702/150 |
| 6,924,741 | B2 | * | 8/2005 | Tamayama et al. ......... 340/572.1 |
| 8,756,004 | B2 | * | 6/2014 | Chou .............................. 701/428 |

(Continued)

FOREIGN PATENT DOCUMENTS

| | | |
|---|---|---|
| JP | 2002058057 A | 2/2002 |
| JP | 2004-354351 A | 12/2004 |

(Continued)

OTHER PUBLICATIONS

Japanese Office Action dated Jan. 29, 2013 (and English translation thereof) in counterpart Japanese Application No. 2011-063479.

(Continued)

*Primary Examiner* — Benjamin C Lee
*Assistant Examiner* — Stephen Burgdorf
(74) *Attorney, Agent, or Firm* — Holtz, Holtz, Goodman & Chick PC

(57) ABSTRACT

A portable terminal includes: a reader that reads identification information of an RFID tag; a position information detector that detects position information; a direction information detector that detects direction information; a storage controller that performs acquisition of reading direction of the reader from direction information detected by the direction information detector, and storage of (i) position information detected at the time of the reading of the identification information and (ii) the acquired reading direction information as (i) reading position and (ii) reading direction, so as to be correlated with the identification information of the RFID tag; and a notification controller that acquires reading direction of the reader from direction information, and causes a notification unit to make notification of guide information indicating the stored reading position and the stored reading direction with respect to detected position information and the acquired reading direction.

11 Claims, 10 Drawing Sheets

(56) References Cited

U.S. PATENT DOCUMENTS

| | | | |
|---|---|---|---|
| 2004/0182925 A1* | 9/2004 | Anderson et al. | 235/385 |
| 2004/0183674 A1* | 9/2004 | Ruvarac | 340/539.13 |
| 2004/0204825 A1* | 10/2004 | Maruyama et al. | 701/200 |
| 2005/0149231 A1* | 7/2005 | Pretlove et al. | 700/264 |
| 2008/0225137 A1 | 9/2008 | Kubo et al. | |
| 2008/0276014 A1* | 11/2008 | Doi et al. | 710/15 |
| 2009/0224045 A1* | 9/2009 | Toda et al. | 235/439 |
| 2011/0316675 A1* | 12/2011 | Tsujimoto et al. | 340/10.4 |
| 2012/0154195 A1* | 6/2012 | Nystrom et al. | 341/176 |

FOREIGN PATENT DOCUMENTS

| | | |
|---|---|---|
| JP | 2005-197797 A | 7/2005 |
| JP | 2008-227877 A | 9/2008 |
| JP | 2010066149 A | 3/2010 |

OTHER PUBLICATIONS

Japanese Office Action dated Aug. 20, 2014, issued in counterpart Japanese Application No. 2013-220720.

* cited by examiner

PORTABLE TERMINAL AND COMPUTER PROGRAM FOR LOCATING OBJECTS WITH RFID TAGS BASED ON STORED POSITION AND DIRECTION DATA

CROSS REFERENCE TO RELATED APPLICATION(S)

The present disclosure relates to the subject matters contained in Japanese Patent Application No. 2011-063479 filed on Mar. 23, 2011, which are incorporated herein by reference in its entirety.

FIELD

The present invention relates to a portable terminal and a computer program product.

BACKGROUND

A radio frequency identification (RFID) technology is known in which an RFID reader/writer reads information from an RFID tag by a short-distance wireless communication via radio waves or an electromagnetic field. This RFID technology is widely used in tickets for trains, busses, etc., digital money, staff identity cards, etc.

Techniques of using the RFID technology for position measurement are also known. For example, a configuration is known which shoots a subject with a video camera while its three or more wireless communication units communicate with a wireless tag attached to the subject and measures the position of the subject on the principle of trilateration using differences between times that wireless signals take to travel from the wireless tag to the respective wireless communication units (see JP-A-2008-227877, for instance). Information of the measured position of the subject is displayed on a display unit of the video camera.

There is a demand for application of the RFID technology to management of goods such as goods stored in a warehouse. More specifically, goods in stock are managed in such a manner that users read, with an RFID reader/writer, RFID tags attached to reading subject goods in a warehouse. Since the RFID tag readable range is small, it is necessary for a user to move to find a reading subject article to which an RFID tag is attached. However, there may occur an event that a user who is not experienced in good management work does not know an approximate position of an article and hence needs to search for it. This may be a heavy work load and take long time.

The related-art configuration which measures the position of a subject to which a wireless tag is attached through trilateration allows a user to measure the position of a subject by approaching it if an approximate position of the subject (wireless tag) is known. However, in a state that the position of a subject is not known at all, a user is required to find the subject and approach it. As a result, even if the conventional trilateration-based position measurement technology using a wireless tag is applied to goods management, users may suffer heavy work loads and long work hours.

SUMMARY

One of objects of the present invention is to reduce a work load and a time that are required to find a reading subject to which an RFID tag is attached.

A portable terminal according to one or more embodiments of the invention includes: a reader that reads identification information of an RFID tag from the RFID tag; a position information detector that detects position information of the portable terminal; a direction information detector that detects direction information of the portable terminal; a storage controller that performs, upon reading of identification information of the RFID tag by the reader, acquisition of reading direction of the reader from direction information detected by the direction information detector at the time of the reading of the identification information of the RFID tag, and storage, in a storage unit, of (i) position information detected by the position information detector at the time of the reading of the identification information of the RFID tag and (ii) the acquired reading direction information as (i) reading position and (ii) reading direction, so as to be correlated with the identification information of the RFID tag; and a notification controller that acquires reading direction of the reader from direction information detected by the direction information detector, and causes a notification unit to make notification of guide information indicating the reading position and the reading direction stored in the storage unit with respect to position information detected by the position information detector and the acquired reading direction.

A computer program product according to one or more embodiments of the invention is readable by a computer for a portable terminal and encodes commands to execute computer processing. The computer processing includes: reading identification information of an RFID tag from the RFID tag; detecting position information of the portable terminal; detecting direction information of the portable terminal; performing, upon reading of identification information of the RFID tag, acquisition of reading direction of the reading from direction information detected by the direction information detection at the time of the reading of the identification information of the RFID tag, and storage, in a storage unit, of (i) position information detected by the position information detection at the time of the reading of the identification information of the RFID tag and (ii) the acquired reading direction information as (i) reading position and (ii) reading direction, so as to be correlated with the identification information of the RFID tag; and acquiring reading direction of the reading from direction information detected by the direction information detection, and causing a notification unit to make notification of guide information indicating the reading position and the reading direction stored in the storage unit with respect to position information detected by the position information detection and the acquired reading direction.

According to this invention, a work load and a time that are required to find a reading subject to which an RFID tag is attached can be reduced.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

An embodiment of the present invention and its first to third modifications will be hereinafter described in order in detail with reference to the accompanying drawings. However, the invention is not limited to them.

Embodiment

Figure 1:
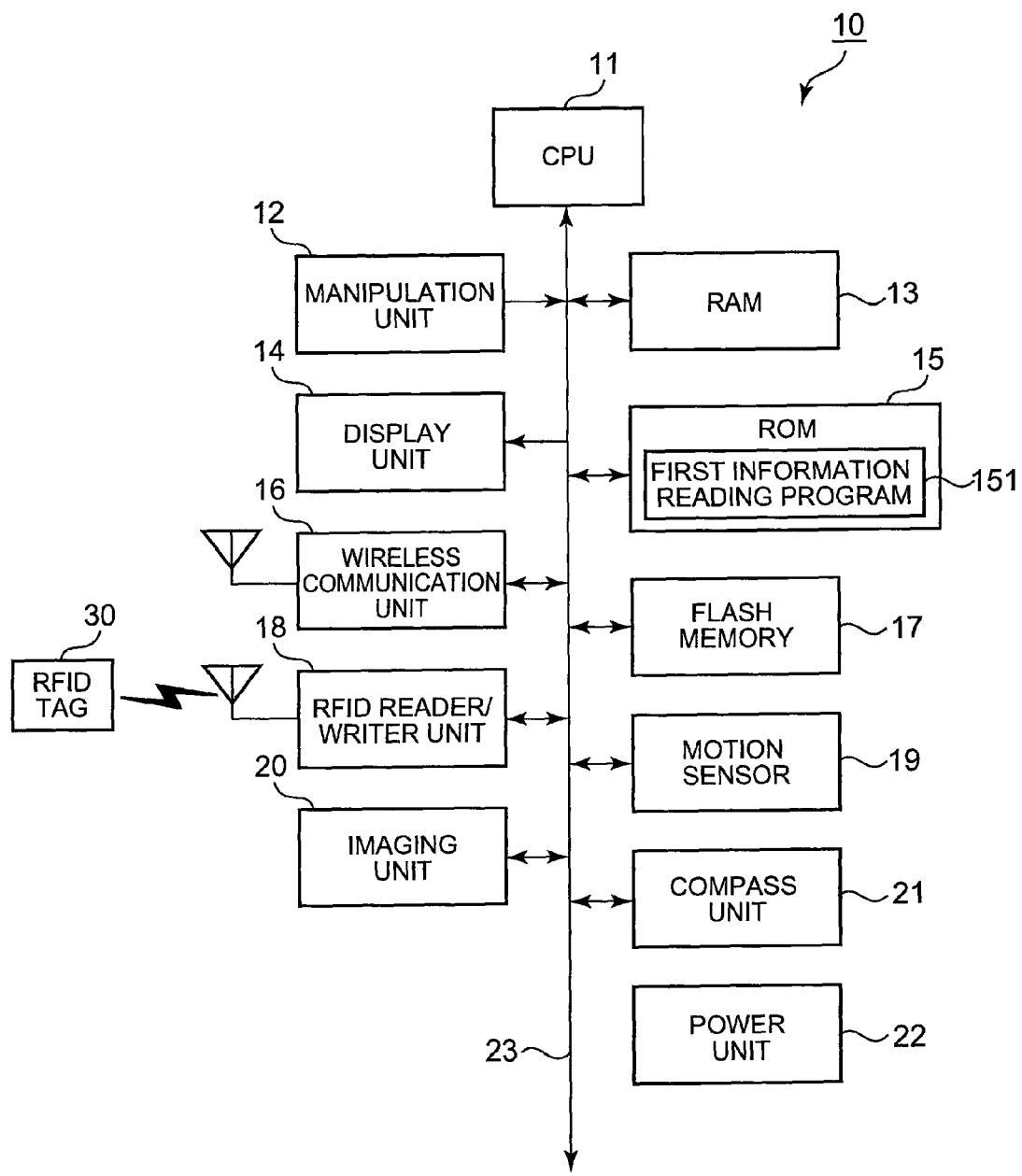
FIG. 1 is a block diagram showing a functional configuration of a portable terminal according to an embodiment of the present invention.

The embodiment of the invention will be described below with reference to FIG. 1 to FIG. 7. First, a device configuration according to the embodiment will be described with reference to FIG. 1. FIG. 1 shows a functional configuration of a portable terminal 10 according to the embodiment.

The portable terminal 10 according to the embodiment is a handy terminal for reading information stored in an RFID tag 30 attached to an article as a reading subject and making a display of guidance on a position where to perform reading and a reading direction.

The embodiment is directed to a case that the portable terminal 10 is used for inventory of goods stored in a warehouse which is carried out every prescribed period (e.g., every six months). A user inventories the goods stored in the warehouse by reading information stored in an RFID tag 30 attached to each article using the portable terminal 10. However, the manner of use of the invention is not limited to this example.

The RFID tag 30 is a radio wave type or electromagnetic induction type RFID tag. The RFID tag 30 is equipped with a communication unit including an antenna or a coil antenna, a controller, and an electrically erasable programmable read-only memory (EEPROM). In the RFID tag 30, the controller causes the communication unit to perform a wireless communication with the portable terminal 10 via radio waves or an electromagnetic field, reads data stored in the EEPROM in response to a read request received from the portable terminal 10, and sends the read-out data to the portable terminal 10. Furthermore, the controller of the RFID tag 30 writes or rewrites data received from the portable terminal 10 to the EEPROM.

It is assumed that the EEPROM of the RFID tag 30 is stored with individual identification information of the RFID tag 30. It is also assumed that the RFID tag 30 is a passive RFID tag (passive tag) acquires power from radio waves or an electromagnetic field transmitted from or generated by the portable terminal 10. However, the RFID tag 30 may be an active RFID tag (active tag) which has a power unit and sends radio waves or generates an electromagnetic field on power generated by the power unit.

The portable terminal 10 is equipped with a CPU (central processing unit) 11 serving as a storage controller and a notification controller, a manipulation unit 12, a RAM (random access memory) 13, a display unit 14 serving as a notification unit, a ROM 15, a wireless communication unit 16, a flash memory 17 serving as a storage unit, an RFID reader/writer unit 18 serving as a reader, a motion sensor 19 serving as a position information detector, an imaging unit 20, a compass unit 21 serving as a direction information detector, and a power unit 22. The individual units of the portable terminal 10 excluding the power unit 22 are connected to each other by a bus 23.

The CPU 11 controls the individual units of the portable terminal 10 excluding the power unit 22. The CPU 11 reads a specified program among various programs from the ROM 15, develops it in the RAM 13, and performs one of various kinds of processing in cooperation with the developed program.

According to a first information reading program 151, the CPU 11 acquires reading direction information of the RFID reader/writer unit 18 on the basis of direction information (cardinal direction information) of the portable terminal 10 that is detected by the compass unit 21 when an RFID tag 30 is read, and stores position information that is detected by the motion sensor 19 when the RFID tag 30 is read and the acquired reading direction information in the flash memory 17 as reading position and reading direction, respectively, in such a manner that they are correlated with the individual identification information of the RFID tag 30. Furthermore, the CPU 11 displays a preview image (through-the-lens image) taken by the imaging unit 20 on the display unit 14, acquires reading direction information of the RFID reader/writer unit 18 on the basis of direction information detected by the compass unit 21, and displays, in the preview image, marks indicating reading position information and reading direction stored in the flash memory 17 with respect to position information detected by the motion sensor 19 and the acquired reading direction information, to notify the user of these pieces of information.

The manipulation unit 12 is equipped with a key group consisting of various keys such as character input keys, and outputs manipulation information to the CPU 11 in response to pressing of each key by the user.

The RAM 13, which is a volatile semiconductor memory, has a work area for storing various data and various programs.

The display unit 14, which is equipped with a display panel such as a liquid crystal display (LCD) or an electroluminescence (EL) display, makes one of various kinds of display on the display panel according to display information that is supplied from the CPU 11.

The ROM 15 is a semiconductor memory dedicated to reading which is stored with various data and various programs. The ROM 15 is stored with the first information reading program 151.

The wireless communication unit 16 is of a wireless LAN communication type. The wireless communication unit 16 is equipped with an antenna, a modulation section, a demodulation section, a signal processing section, etc., and performs a wireless communication with an access point. In the wireless communication unit 16, a signal of information to be transmitted is subjected to signal processing in the signal processing section and modulated by the modulation section. A resulting signal is sent to the access point as radio waves. The access point is connected to a communication destination apparatus via a wired LAN. In the wireless communication unit 16, a reception signal carried by radio waves received from the access point by the antenna is demodulated by the demodulation section and subjected to signal processing in the signal processing section, whereby reception information is obtained. In this manner, the wireless communication unit 16 communicates with the communication destination apparatus via the access point. The wireless communication unit 16 may be configured so as to perform a wireless communication of another communication scheme.

The flash memory 17 is a nonvolatile semiconductor memory for storing information in such a manner that it can be read out and subjected to rewriting. A read-out information table 40 which will be described later is stored in the flash memory 17.

The RFID reader/writer unit 18 is a radio wave type or electromagnetic induction type reader/writer for reading information stored in an RFID tag 30 and writing information to an RFID tag 30. The RFID reader/writer unit 18 performs modulation etc. on an electrical signal of transmission data supplied from the CPU 11 and sends radio waves or an electromagnetic field from the antenna or the coil antenna. An RFID tag 30 receives the radio waves or the electromagnetic field sent from by the RFID reader/writer unit 18. The RFID tag 30 sends radio waves or an electromagnetic field representing transmission data. The RFID reader/writer unit 18 receives the radio waves or the electromagnetic field sent from by the RFID tag 30 by the antenna or the coil antenna, performs demodulation etc. on a resulting electrical signal, and acquires the data.

A communication performed by the RFID reader/writer unit 18 has directivity. The RFID reader/writer unit 18 of the portable terminal 10 reads information from an RFID tag 30 that is located on the direction in which the RFID reader/writer unit 18 can perform a good communication. The direction in which the RFID reader/writer unit 18 can read information from an RF tag 30 is referred to as a reading direction.

The motion sensor 19 is a sensor for detecting position information of the portable terminal 10. The motion sensor 19 is equipped with an acceleration sensor, a geomagnetism sensor, and a controller (CPU). The acceleration sensor is a sensor for detecting acceleration information of the portable terminal 10. The geomagnetism sensor, which is an electronic compass, is a sensor for detecting direction information (cardinal direction information) of the portable terminal 10. The controller calculates position information of the portable terminal 10 in a horizontal plane using the acceleration information detected by the acceleration sensor and the direction information detected by the geomagnetism sensor, and outputs the calculated position information to the CPU 11. Therefore, the motion sensor 19 can detect position information in indoor facilities such as a warehouse as well as outdoors.

The imaging unit 20 serves to take an image of a subject, and is equipped with an optical system, an imaging device, etc. In the imaging unit 20, the imaging device converts light that shines on it via the optical system and carries a subject image into an output image signal. The direction in which the imaging unit 20 shoots a subject is referred to as a shooting direction.

The compass unit 21, which is a geomagnetism sensor, detects direction information of the portable terminal 10 and outputs the detected direction information to the CPU 11. The geomagnetism sensor in the motion sensor 19 may be used as the compass unit 21.

The power unit 22, which is a secondary battery such as a lithium battery, supplies power to the individual units of the portable terminal 10. The power unit 22 may be a primary battery such as an alkaline battery.

Figure 2:
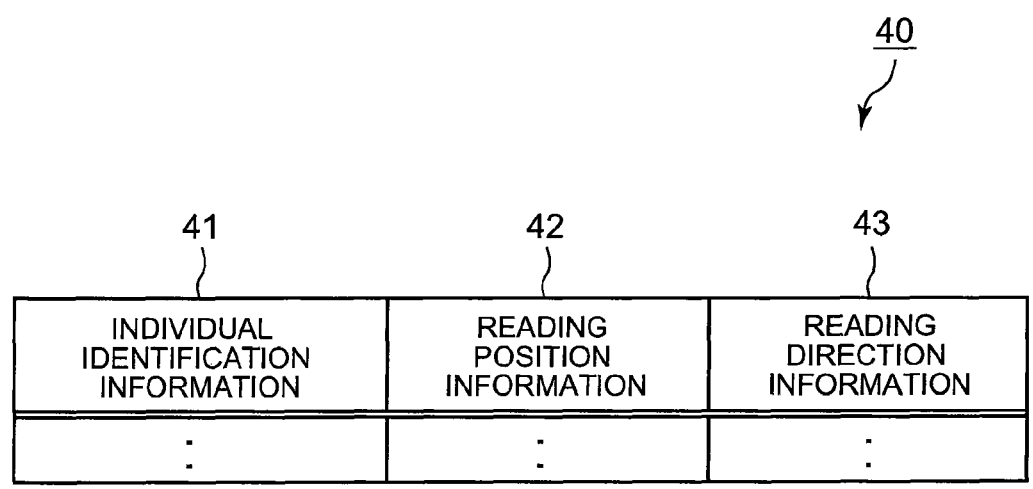
FIG. 2 shows a configuration of a read-out information table.

Next, pieces of information stored in the portable terminal 10 will be described with reference to FIG. 2. FIG. 2 shows a configuration of a read-out information table 40.

When a first information reading process which will be described later has been executed, as shown in FIG. 2 a record is added to the read-out information table 40 stored in the flash memory 17 or a record of the read-out information table 40 is rewritten. The read-out information table 40 has fields of individual identification information 41, reading position information 42, and reading direction information 43.

The individual identification information 41 serves for identification of an RFID tag 30. The reading position information 42 is position information of the user (portable terminal 10) that was acquired when an RFID tag 30 corresponding to the individual identification information 41 was read. The reading direction information 43 is direction information of the RFID reader/writer unit 18 of the portable terminal 10 that was acquired when the RFID tag 30 corresponding to the individual identification information 41 was read.

Next, how the portable terminal 10 operates will be described with reference to FIG. 3 to FIG. 7.

Figure 3:
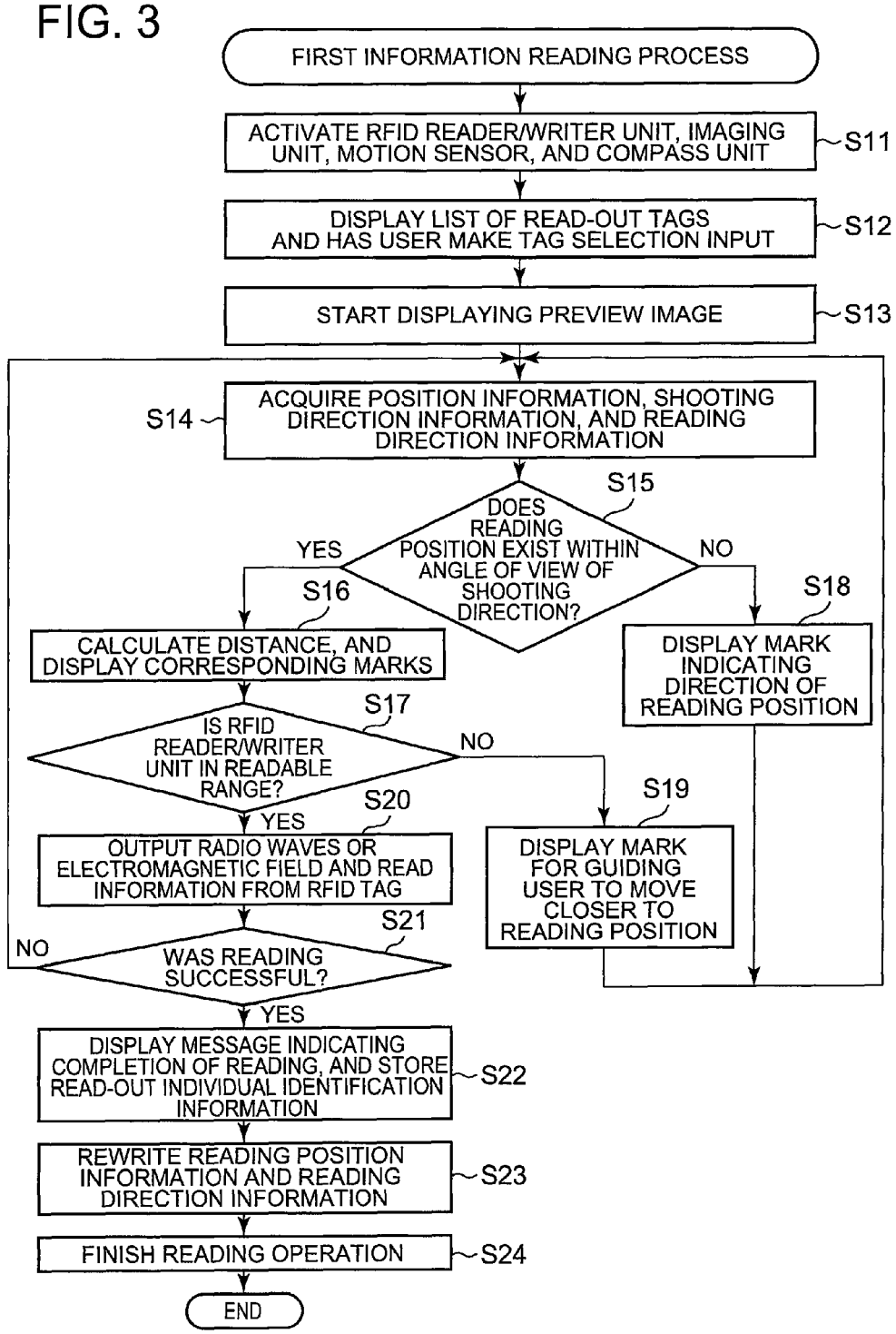
FIG. 3 is a flowchart of a first information reading process.

FIG. 3 is a flowchart of a first information reading process.

Figure 4A:
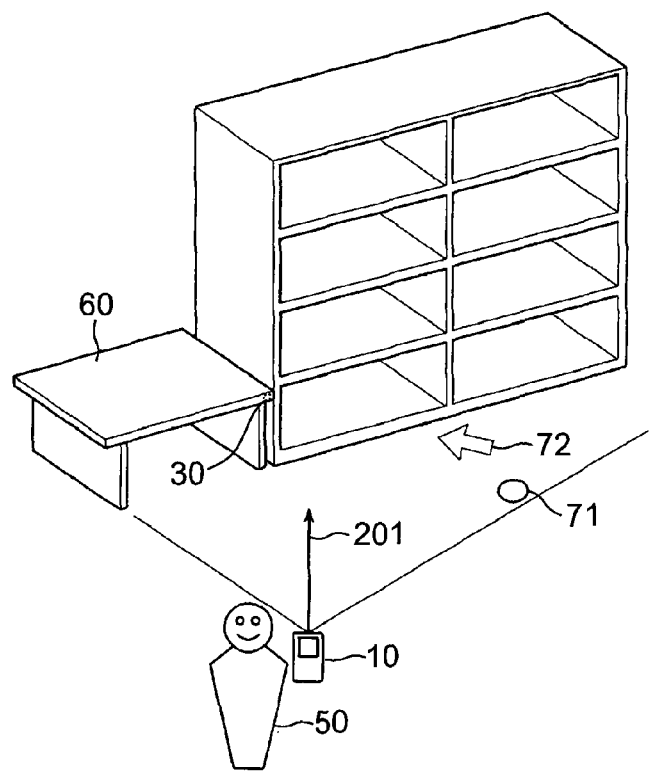
FIG. 4A shows how shooting is performed before reading of an RFID tag.

FIG. 4A shows how shooting is performed before reading of an RFID tag 30.

Figure 4B:
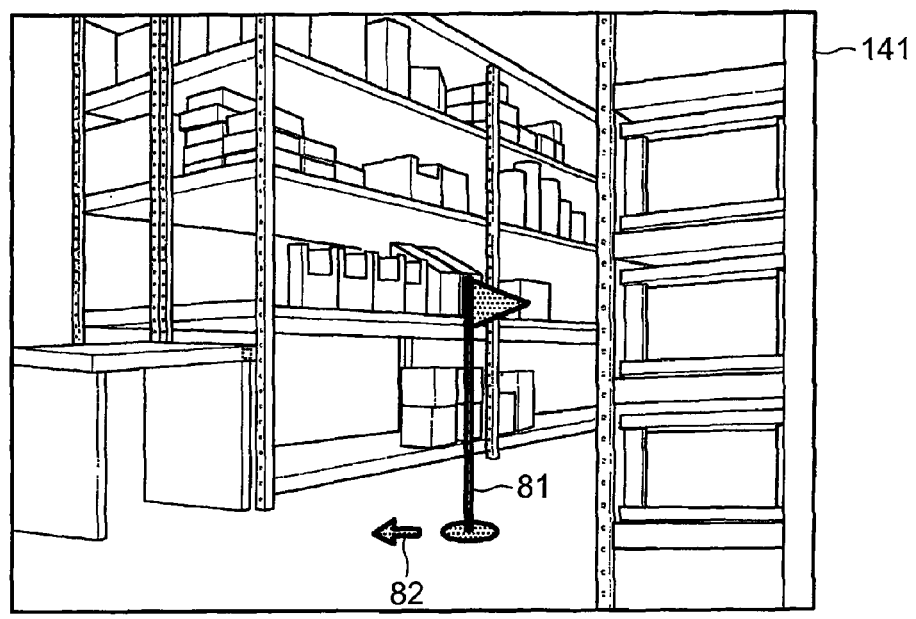
FIG. 4B shows a preview image including marks indicating a reading position and a reading direction of the RFID tag.

FIG. 4B shows a preview image 141 including a mark 81 indicating a reading position and a mark 82 of a reading direction.

Figure 5:
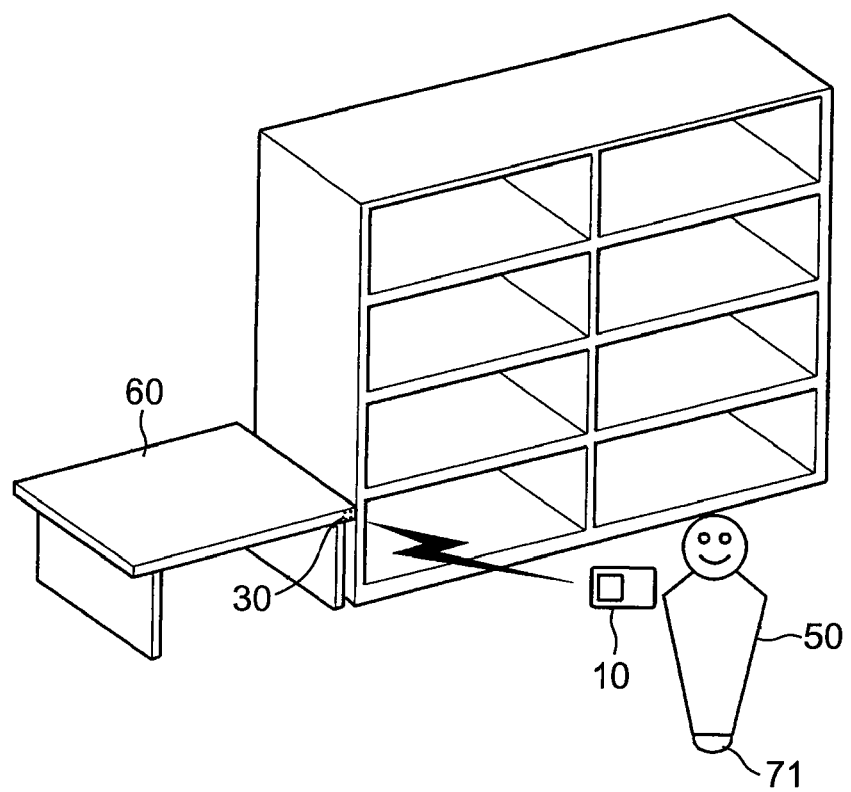
FIG. 5 shows how a guide destination RFID tag is read.

FIG. 5 shows how a guide destination RFID tag 30 is read.

Figure 6:
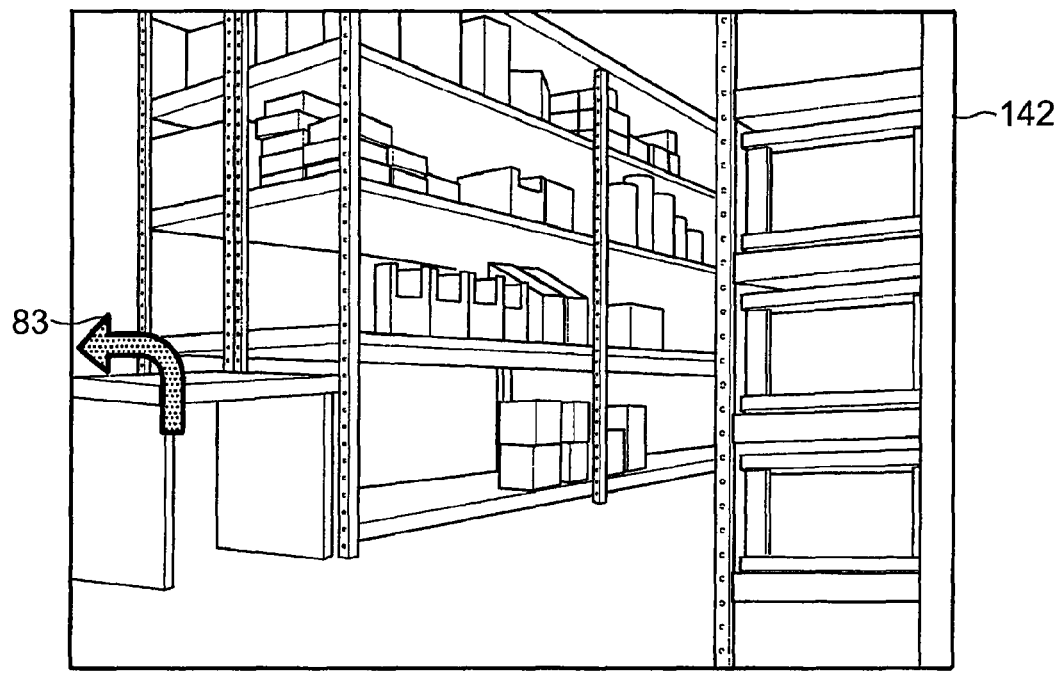
FIG. 6 shows a preview image including a mark that instructs a user to rotate a shooting direction leftward.

FIG. 6 shows a preview image 142 including a mark 83 that instructs a user to rotate a shooting direction leftward.

Figure 7:
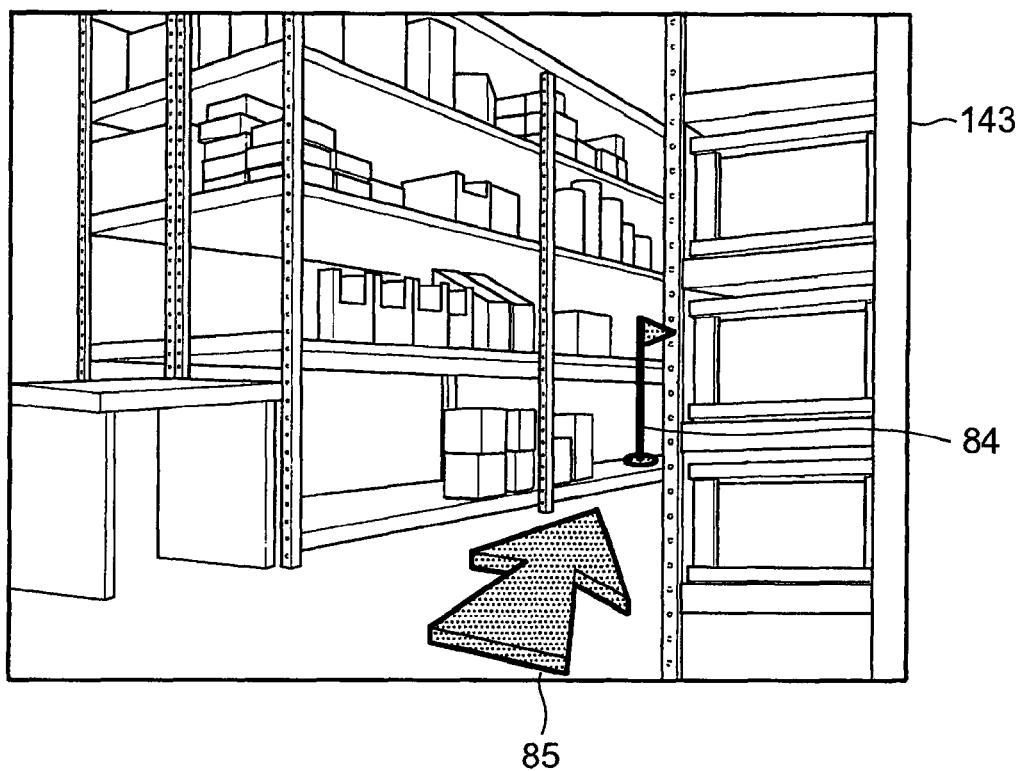
FIG. 7 shows a preview image including a mark indicating a reading position and a mark that instructs a user to approach the reading position.

FIG. 7 shows a preview image 143 including a mark 84 indicating a reading position of the RFID tag 30 and a mark 85 that instructs a user to approach the reading position.

The first information reading process which is executed by the portable terminal 10 is a process of having the user select the RFID tag 30 of a reading subject, guiding the user to read information from the RFID tag 30 by displaying marks indicating its reading position and reading direction, and reading information from the guide destination RFID tag 30. In the portable terminal 10, triggered by the user's input, through the manipulation unit 12, of an instruction to perform the first information reading process, the CPU 11 executes the first information reading process in cooperation with the first information reading program that has been read from the ROM 15 and developed in the RAM 13 as appropriate.

First, at step S11, the CPU 11 activates the RFID reader/writer unit 18, the imaging unit 20, the motion sensor 19, and the compass unit 21. At step S12, the CPU 11 displays, on the display unit 14, a list of all pieces of individual identification information 41 or article names corresponding to all pieces of individual identification information 41 by referring to the read-out information table 40 stored in the flash memory 17 and has the user make an input of selecting a piece of individual identification information 41 or an article name from the list through the manipulation unit 12.

At step S13, the CPU 11 starts displaying a preview image taken by the imaging unit 20 on the display unit 14. At step S14, the CPU 14 acquires position information of the user (portable terminal 10) detected by the motion sensor 19 and calculates shooting direction information of the imaging unit 20 and reading direction information of the RFID reader/writer unit 18 on the basis of direction information detected by the compass unit 21.

At step S15, the CPU 11 acquires reading position information 42 corresponding to the individual identification information that was selected at step S12. The CPU 11 judges, using the position information of the user (portable terminal 10) acquired at step S14, whether or not a reading position represented by the acquired reading position information 42 exists within the angle of view of a preview image corresponding to the shooting direction information acquired at step S14.

If the reading position exists within the angle of view corresponding to the shooting direction information (S15: yes), at step S16 the CPU 11 acquires the reading direction information 43 corresponding to the individual identification information 41 selected at step S12 by referring to the read-out information table 40 stored in the flash memory 17. Furthermore, the CPU 11 calculates a distance between the positions represented by the reading position information 42 acquired at step S15 and the position information of the user (portable terminal 10) acquired at step S14. Still further, the CPU 11 displays marks corresponding to the calculated distance and the acquired reading direction information 43 in the preview image being displayed on the display unit 14 at a position corresponding to the reading position information 42 acquired at step S15.

At step S16, a mark such as a flag indicating the reading position and a mark such as an arrow corresponding to the acquired reading direction information 43 and indicating the reading direction are displayed in the preview image in superimposition at a position corresponding to the reading position information 42 at sizes of perspective drawing corresponding to the distance between the positions represented by the acquired reading position information 42 and the acquired position information of the user (portable terminal 10).

At step S17, the CPU 11 judges whether or not the RFID reader/writer unit 18 (portable terminal 10) is in such a range (in terms of distance and direction) as to be able to read the RFID tag 30, on the basis of the reading direction information acquired at step S14, the distance (calculated at step S16) between the positions represented by the reading position information 42 and the position information of the user (portable terminal 10), and the reading direction information 43 acquired at step S16.

If the reading position does not exist within the angle of view corresponding to the shooting direction information (S15: no), at step S18 the CPU 11 displays, in the preview image being displayed on the display unit 14, a mark indicating the reading position (represented by the reading position information 42 acquired at step S15) that is outside the preview image corresponding to the shooting direction information acquired at step S14. Then, the process returns to step S14.

At step S18, a mark such as an arrow indicating whether the reading position is located on the left side or right side of the preview image (outside the preview image) is displayed in the preview image in superimposition.

If the RFID reader/writer unit 18 (portable terminal 10) is not in such a range as to be able to read the RFID tag 30 (S17: no), at step S19 the CPU 11 displays a mark for guiding the user to move closer to the reading position in the preview image being displayed on the display unit 14 on the basis of the distance (calculated at step S16) between the positions represented by the reading position information 42 and the position information of the user (portable terminal 10) and the reading position information 42 acquired at step S15. Then, the process returns to step S14.

At step S19, a mark such as an arrow for guiding the user to move closer to the reading position is displayed in the preview image in superimposition.

If the RFID reader/writer unit 18 (portable terminal 10) is in such a range as to be able to read the RFID tag 30 (S17: yes), at step S20 the CPU 11 causes the RFID reader/writer unit 18 to output radio waves or an electromagnetic field and thereby read information (individual identification information 41) stored in the RFID tag 30. At step S21, the CPU 11 judges whether or not the information reading that was performed by the RFID reader/writer unit 18 at step S20 was successful.

If the information reading performed by the RFID reader/writer unit 18 was not successful (S21: no), the process returns to step S14. If the information reading performed by the RFID reader/writer unit 18 was (S21: yes), at step S22 the CPU 11 displays, on the display unit 14, a message to the effect that the reading of the individual identification information 41 selected at step S12 by the RFID reader/writer unit 18 has completed and stores the read-out individual identification information in the flash memory 17.

At step S23, the CPU 11 refers to the read-out information table 40 stored in the flash memory 17 and replaces the reading position information 42 and the reading direction information 43 corresponding to the individual identification information 41 selected at step S12 with the position information and the reading direction information acquired at step S14. At step S24, the CPU 11 finishes reading operation of the RFID reader/writer unit 18 including the output of radio waves or an electromagnetic field and finishes the first information reading process.

Specific example images displayed in the first information reading process will be described below.

As shown in FIG. 4A, a description will be made of an example in which a user 50 manages a desk 60 which is an article (reading subject) stored in a warehouse using the portable terminal 10 by reading an RFID tag 30 attached to the desk 60.

The following assumptions are made. The RFID tag 30 of the desk 60 was read in a previous reading operation. A previous reading position of the RFID tag 30 is a reading position 71 and a previous reading direction of the RFID tag 30 is a reading direction 72. The user 50 cannot directly see the reading position 71 and the reading direction 72 of the RFID tag 30. Individual identification information 41 of the RFID tag 30, reading position information 42 of the reading position 71, and reading position direction information 43 of the reading direction 72 are stored in the read-out information table 40.

The first information reading process is started in the portable terminal 10, and at step S12 the user 50 makes an input of selecting the individual identification information corresponding to the RFID tag 30 that is attached to the desk 60. Then, the user 50 directs the shooting direction 201 of the portable terminal 10 to a direction on which the reading position (reading position 71) of the desk 60 is likely located. If the reading position 71 is included in the angle of view corresponding to the shooting direction 201 (see FIG. 4A), at step S16 a preview image 141 shown in FIG. 4B is displayed on the display unit 14.

The preview image 141 includes a flag mark 81 whose position and size correspond to the reading position 71 and an arrow mark 82 which corresponds to the reading direction 72.

While viewing the preview image 141 displayed on the display unit 14, the user 50 moves to the position of the mark 81 and directs the reading direction of the RFID reader/writer unit 18 of the portable terminal 10 to the direction indicated by the mark 82. As a result, as shown in FIG. 5, at step S20 the individual identification information stored in the RFID tag 30 attached to the desk 60 is read by the RFID reader/writer unit 18 of the portable terminal 10.

In a case that individual identification information of an article that is located on the left of the desk 60 is selected at step S12, the shooting direction of the portable terminal 10 approximately coincides with the shooting direction 201, and the corresponding reading position is not included in a preview image, at step S18 a preview image 142 is displayed on the display unit 14 (see FIG. 6). The preview image 142 includes an arrow mark 83 indicating that the reading position is located on the left of the preview image 142 (outside the preview image 142).

In a case that the individual identification information of the desk 60 is selected at step S12, the shooting direction of the portable terminal 10 approximately coincides with the shooting direction 201, and the corresponding reading position is located on the deep side of the reading position 71 (i.e., is distant from the current position of the user 50), at step S19 a preview image 143 is displayed on the display unit 14 (see FIG. 7). The preview image 143 includes a small flag mark 84 that indicates the reading position and is smaller than the mark 81 and a wide, stereoscopic arrow mark 85 for guiding the user 50 to move closer to the reading position.

As described above, in the portable terminal 10 according to the embodiment, reading direction information of the RFID reader/writer unit 18 is acquired on the basis of direction information of the portable terminal 10 that is detected by the compass unit 21 when an RFID tag 30 is read. And position information that is detected by the motion sensor 19 when the RFID tag 30 is read and the acquired reading direction information are stored in the flash memory 17 as reading position information and reading direction, respectively, so as to be correlated with identification information of the RFID tag 30. Furthermore, in the portable terminal 10, a preview image taken by the imaging unit 20 is displayed on the display unit 14, reading direction information of the RFID reader/writer unit 18 is acquired from direction information detected by the compass unit 21, and marks (pieces of first guide information) indicating reading position information and reading direction stored in the flash memory 17 are displayed in the preview image with respect to position information detected by the motion sensor 19 and the acquired reading position information, respectively, to notify the user of these pieces of information.

As a result, the user can easily recognize visually reading position information and reading direction of the RFID tag 30 of a reading subject, whereby a work load and a time that are required to find the reading subject can be reduced.

The portable terminal 10 receives an input of selecting the RFID tag 30 of a reading subject via the manipulation unit 12 and displays, in a preview image, marks indicating reading position information and reading direction of the selected RFID tag 30 of the reading subject. Therefore, no marks corresponding to RFID tags 30 of goods other than the reading subject are displayed in the preview image. As a result, the marks indicating the necessary reading position information and reading direction of the RFID tag 30 selected by the user can more easily be recognized visually, whereby a work load and a time that are required to find the reading subject to which the selected RFID tag 30 is attached can further be reduced.

The portable terminal 10 displays marks (the marks 81 and 82 shown in FIG. 4B) corresponding to reading position information and reading direction at sizes corresponding to the depth of the reading position, respectively. This allows the user to easily recognize visually the depth of the reading position.

The portable terminal 10 acquires shooting direction information of the imaging unit 20 from acquired direction information of the portable terminal 10, and judges whether or not a reading position is located outside a preview image using reading position information and the acquired shooting direction. If the reading position is located outside the preview image, the portable terminal 10 displays, in the preview image, a mark (the mark 83 shown in FIG. 6, second guide information) indicating the direction of the reading position. This allows the user to more easily recognize visually the direction of a reading position even if a preview image does not include marks indicating reading position information and reading direction.

The portable terminal 10 calculates a distance between a position represented by position information of the portable terminal 10 detected by the motion sensor 19 and the reading position stored in the flash memory 17. If the calculated distance is longer than or equal to a prescribed distance, the portable terminal 10 displays, in a preview image, a mark (the mark 84 shown in FIG. 7, third guide information) for guiding the user to move closer to the reading position. This allows the user to more easily recognize visually the depth of the reading position.

The portable terminal 10 judges whether or not position information detected by the motion sensor 19 and acquired reading direction information approximately coincide with reading position information and reading direction, respectively (i.e., whether or not the portable terminal 10 is in a readable range). If the judgment result is affirmative, the portable terminal 10 causes the RFID reader/writer unit 18 to read an RFID tag 30. This prevents the RFID reader/writer unit 18 from outputting a useless electromagnetic field or radio waves, whereby power consumption can be reduced.

In the portable terminal 10, its position information is detected by the motion sensor 19. This makes it possible to display marks indicating a reading position and a reading direction of an RFID tag 30 attached to a reading subject that is located indoors (or outdoors).

First Modification

A first modification of the embodiment will be described below with reference to FIG. 8.

Figure 8:
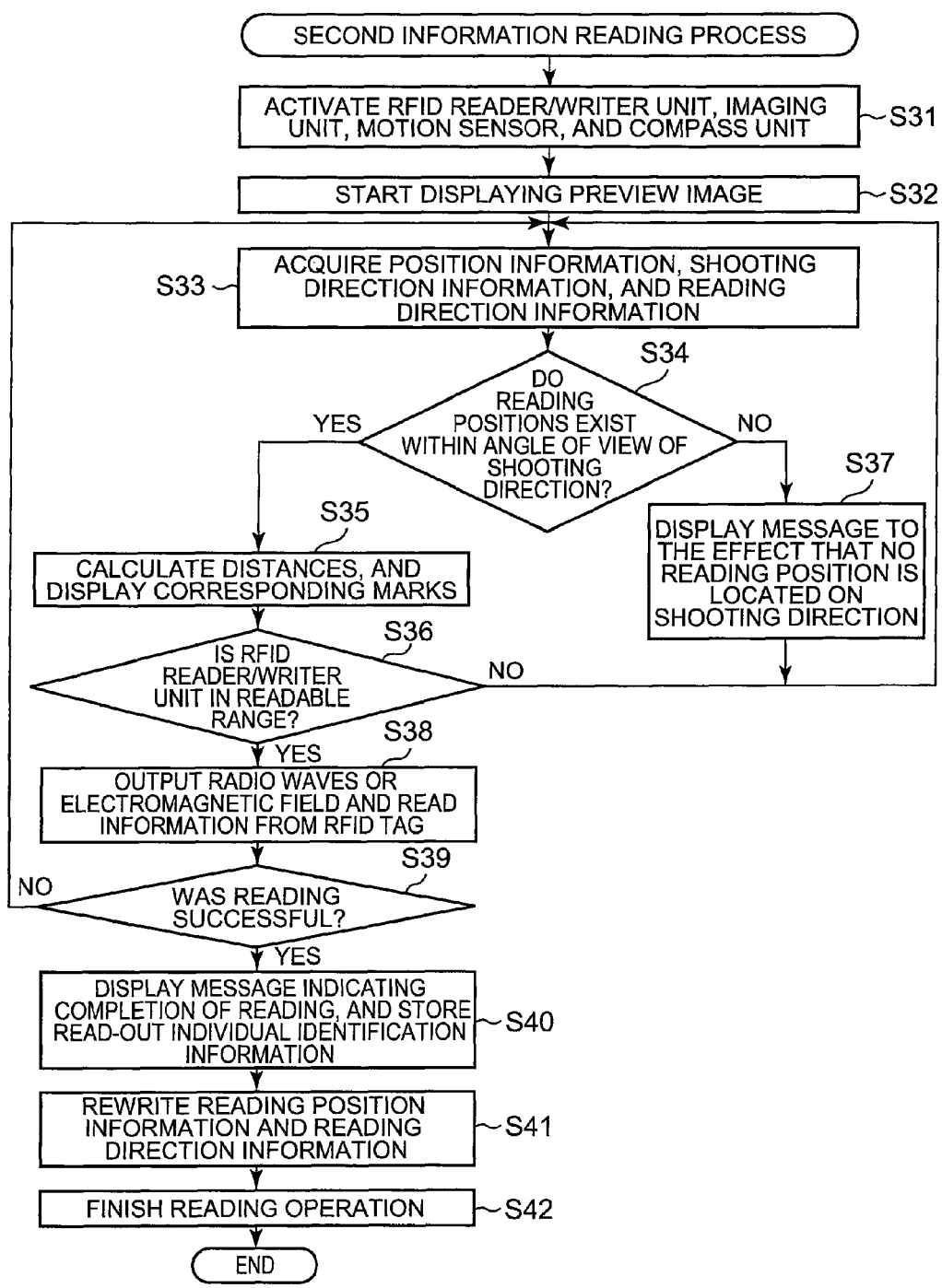
FIG. 8 is a flowchart of a second information reading process.

FIG. 8 is a flowchart of a second information reading process.

In the embodiment, the first information reading process is such that one of the RFID tags 30 of plural reading subjects or the RFID tag 30 of a single reading subject is selected by the user and marks indicating the reading position and the reading direction of the selected RFID tag 30 are displayed to guide the user to read information from the selected RFID tag 30. In the first modification, marks indicating reading positions and reading directions of the RFID tags 30 of plural reading subjects are displayed together to guide the user to read information from RFID tags 30.

The device configuration of this modification is the same as of the portable terminal 10 shown in FIG. 1 except that the ROM 15 is stored with a second information reading program instead of the first information reading program 151.

How a portable terminal 10A according to this modification operates will be described below with reference to FIG. 8. The second information reading process which is executed by the portable terminal 10A is a process of guiding the user by displaying marks indicating reading positions and reading directions of a plural RFID tags 30, and reading information from guide destination RFID tags 30. In the portable terminal 10A, triggered by the user's input, through the manipulation unit 12, of an instruction to perform the second information reading process, the CPU 11 executes the second information reading process in cooperation with the second information reading program that has been read from the ROM 15 and developed in the RAM 13 as appropriate.

Steps S31 to S33 are the same as steps S11, S13, and S14 of the first information reading process shown in FIG. 3. After executing step S33, at step S34 the CPU 11 acquires pieces of reading position information 42 of all records by referring to the read-out information table 40 stored in the flash memory 17. The CPU 11 judges, using the position information of the user (portable terminal 10A) acquired at step S33, whether or not reading positions represented by pieces of acquired reading position information 42 exist within the angle of view of a preview image corresponding to the shooting direction information acquired at step S33.

If reading positions exist within the angle of view corresponding to the shooting direction information (S34: yes), the CPU 11 acquires pieces of reading direction information 43 corresponding to the piece of reading position information 42 that were judged to exist within the angle of view at step S34 by referring to the read-out information table 40 stored in the flash memory 17. Furthermore, the CPU 11 calculates distances between the positions represented by the respective pieces of reading position information 42 acquired at step S34 and the position represented by the position information of the user (portable terminal 10A) acquired at step S33. Still further, the CPU 11 displays marks corresponding to the calculated distances and the acquired pieces of reading direction information 43 in the preview image being displayed on the display unit 14 at positions corresponding to the pieces of reading position information 42 acquired at step S34.

At step S36, the CPU 11 judges whether or not the RFID reader/writer unit 18 (portable terminal 10A) is in such a range (in terms of distance and direction) as to be able to read an RFID tag 30, on the basis of the distances (calculated at step S35) between the positions represented by the pieces of reading position information 42 and the position represented by the position information of the user (portable terminal 10A) and the pieces of reading direction information 43 acquired at step S35.

If no reading position exists within the angle of view corresponding to the shooting direction information (S34: no), at step S37 the CPU 11 displays, in the preview image being displayed on the display unit 14, a message to the effect that no reading position is located on the shooting direction. Then, the process returns to step S33. The process may return to step S33 skipping step S37. Steps S38 to S42 are the same as S20 to S24 of the first information reading process shown in FIG. 3.

As described above, in the portable terminal 10A according to this modification, a preview image taken by the imaging unit 20 is displayed on the display unit 14, reading direction information of the RFID reader/writer unit 18 is acquired from direction information detected by the compass unit 21, and marks as pieces of first guide information indicating all reading positions and reading directions stored in the flash memory 17 are displayed in the preview image with respect to position information detected by the motion sensor 19 and the acquired reading position information to notify the user of these pieces of information.

As a result, the user can easily recognize visually reading position(s) and reading direction(s) of the RFID tag(s) 30 of a all reading subjects, whereby a work load and a time that are required to find the reading subject(s) can be reduced.

Second Modification

A second modification of the embodiment will be described below with reference to FIG. 9.

Figure 9:
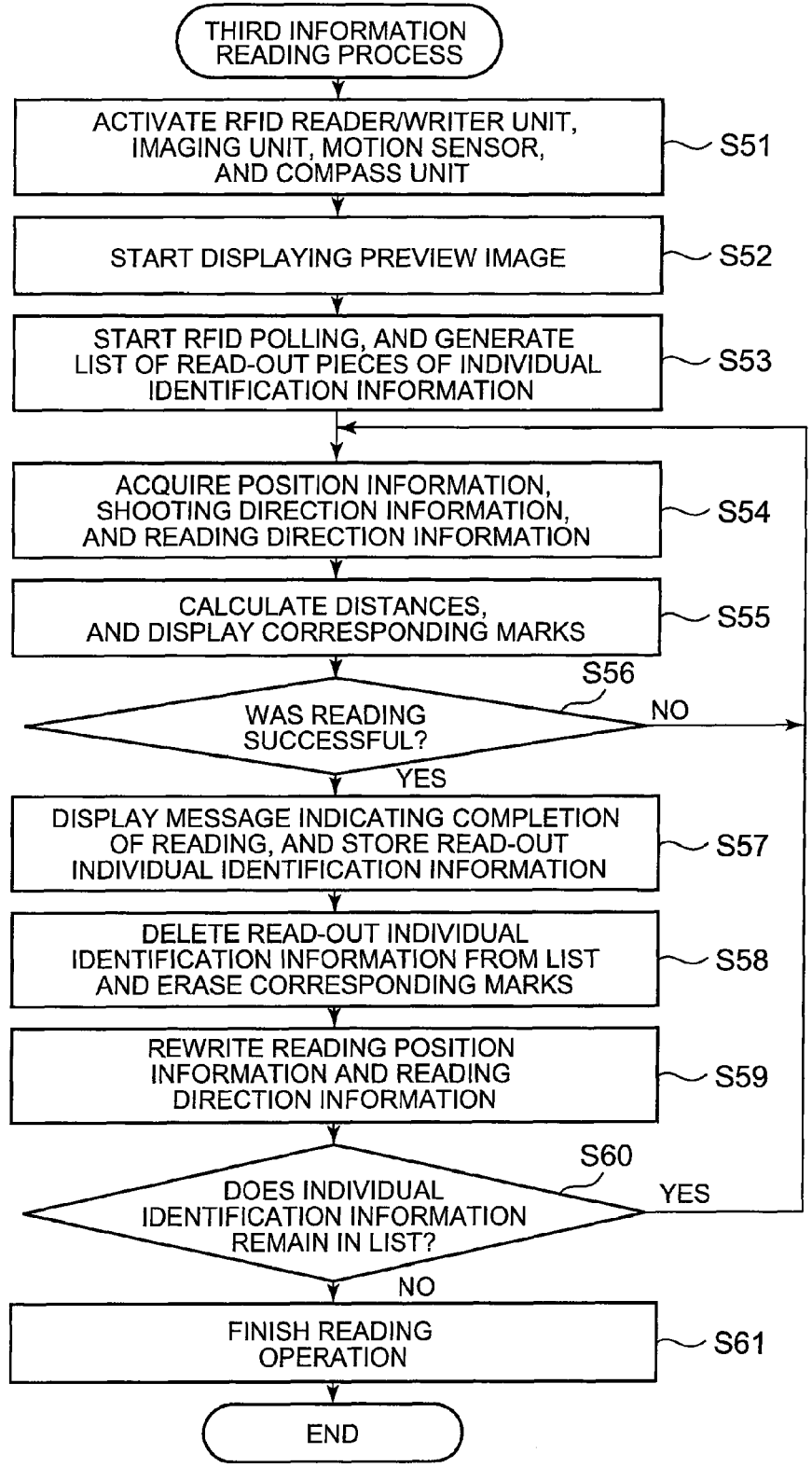
FIG. 9 is a flowchart of a third information reading process.

FIG. 9 is a flowchart of a third information reading process.

In the embodiment, the RFID reader/writer unit 18 outputs radio waves or an electromagnetic field to read information from an RFID tag 30 in the case where position information of the portable terminal 10 and reading direction information of the RFID reader/writer unit 18 indicate that the RFID reader/writer unit 18 is in a readable range. In the second modification, the RFID reader/writer unit 18 performs polling by outputting radio waves or an electromagnetic field and reads information from an RFID tag 30.

The device configuration of this modification is the same as of the portable terminal 10 shown in FIG. 1 except that the ROM 15 is stored with a third information reading program instead of the first information reading program 151.

How a portable terminal 10B according to this modification operates will be described below with reference to FIG. 9. The third information reading process which is executed by the portable terminal 10B is a process of guiding the user by displaying a reading position(s) and a reading direction(s) of a single or plural RFID tags 30, and reading information from a guide destination RFID tag 30. In the portable terminal 10B, triggered by the user's input, through the manipulation unit 12, of an instruction to perform the third information reading process, the CPU 11 executes the third information reading process in cooperation with the third information reading program that has been read from the ROM 15 and developed in the RAM 13 as appropriate.

Steps S51 and S52 are the same as steps S31 and S32 of the second information reading process shown in FIG. 8. After executing step S52, at step S53 starts polling processing of causing the RFID reader/writer unit 18 to output radio waves or an electromagnetic field and reading information (individual identification information) stored in an RFID tag 30. Furthermore, the CPU 11 generates a list of pieces of individual identification information that have been read out by the polling processing. Step S54 is the same as step S33 of the second information reading process shown in FIG. 8.

At step S55, the CPU 11 acquires pieces of reading position information 42 and pieces of reading direction information 43 corresponding to the respective pieces of individual identification information in the list generated at step S53 by referring to the list and the read-out information table 40 stored in the flash memory 17. If it is judged, by using the position information of the user (portable terminal 10B) acquired at step S54, that reading positions represented by acquired pieces of reading position information 42 exist within the angle of view corresponding to the shooting direction information acquired at step S54, the CPU 11 calculates distances between the positions represented by the respective pieces of reading position information 42 and the position represented by the position information of the user (portable terminal 10B) acquired at step S54. Still further, the CPU 11 displays marks corresponding to the calculated distances and acquired pieces of reading direction information 43 in the preview image being displayed on the display unit 14 at positions corresponding to the acquired pieces of reading position information 42.

Steps S56 and S57 are the same as steps S39 and S40 of the second information reading process shown in FIG. 8. After executing step S57, at step S58 the CPU 11 deletes the individual identification information stored at step S57 from the list generated at step S53 and erases the marks corresponding to the individual identification information from the preview image. When step S55 is executed again later, the marks corresponding to the individual identification information thus deleted from the list are not displayed on the preview image.

Step S59 is the same as step S41 of the second information reading process shown in FIG. 8. At step S60, the CPU 11 judges whether or not the list generated at step S53 has a remaining piece of individual identification information. If a piece of individual identification information remains in the list (S60: yes), the process returns to step S54. If not (S60: no), step S61 is executed and the third information reading process is finished. Step S61 is the same as step S42 of the second information reading process shown in FIG. 8.

As described above, in the portable terminal 10B according to this modification, upon a start of the third information reading process for reading RFID tags 30, polling processing of causing the RFID reader/writer unit 18 to read an RFID tag 30 is performed all the time. As a result, reading position information and reading direction information of an RFID tag 30 that is read unexpectedly can also be stored in the flash memory 17 as reading position and reading direction, whereby a work load and a time that are required to find a reading subject to which an RFID tag 30 is attached can further be reduced.

In the portable terminal 10B, if individual identification information of an RFID tag 30 is read out by the RFID reader/writer unit 18 while marks are displayed, marks corresponding to this RFID tag 30 come not to be displayed. Since marks corresponding to RFID tags from which individual identification information has been read out are not displayed in a preview image, marks indicating reading position(s) and reading direction(s) and corresponding to the RFID tag(s) 30 of reading subject(s) can more easily be recognized visually, whereby a work load and a time that are required to find a reading subject to which an RFID tag 30 is attached can further be reduced.

Third Modification

A third modification of the embodiment will be described below with reference to FIG. 10.

Figure 10:
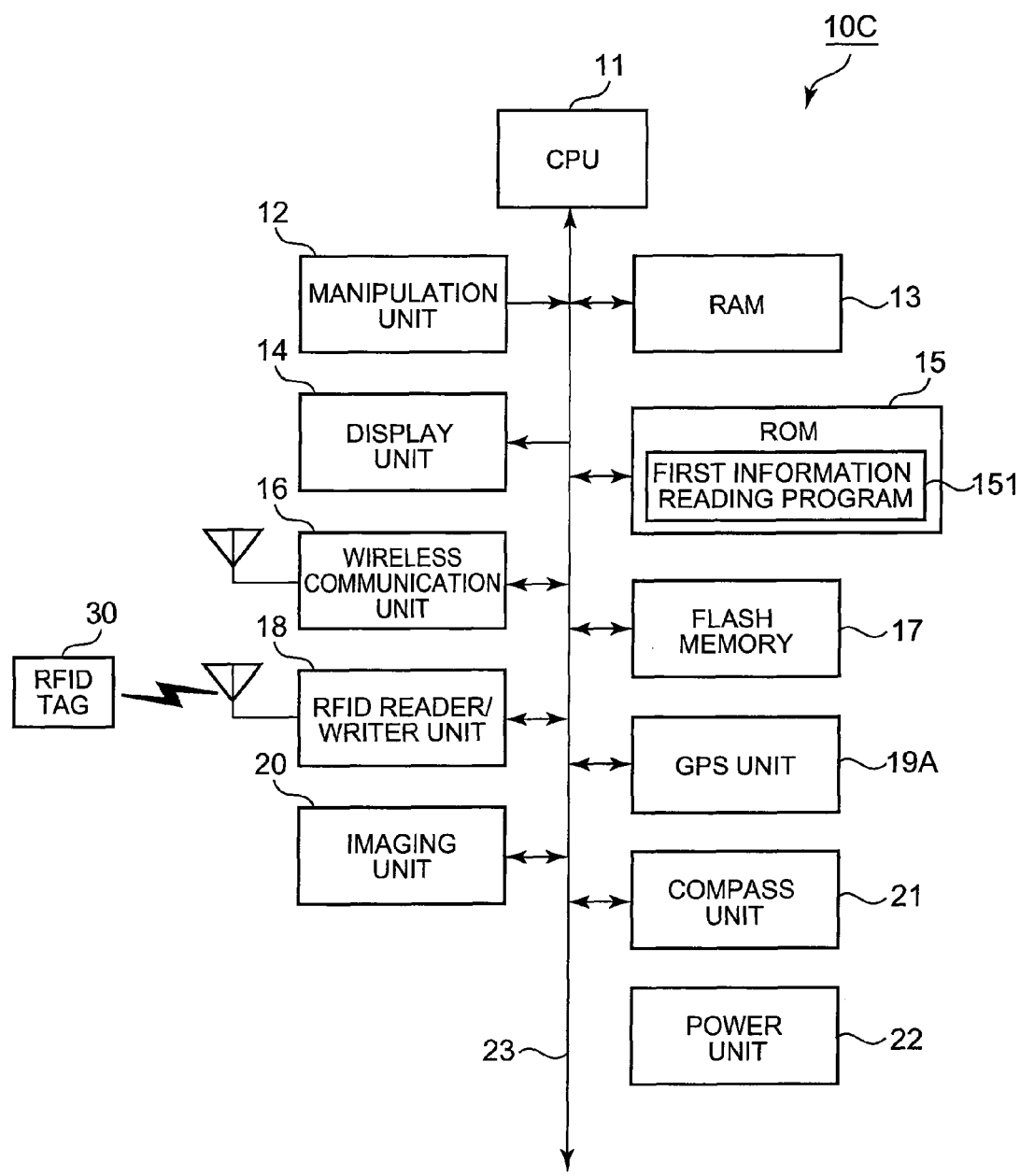
FIG. 10 is a block diagram showing a functional configuration of a portable terminal according to a third modification.

FIG. 10 is a block diagram showing the functional configuration of a portable terminal 10C according to the third modification.

Units of the portable terminal 10C having the same units in the portable terminal 10 shown in FIG. 1 will be given the same reference symbols as the latter and will not be described in detail.

As shown in FIG. 10, the portable terminal 10C is equipped with a CPU 11, a manipulation unit 12, a RAM 13, a display unit 14, a ROM 15, a wireless communication unit 16, a flash memory 17, an RFID reader/writer unit 18, a global positioning system (GPS) unit 19A, an imaging unit 20, a compass unit 21, and a power unit 22. The individual units of the portable terminal 10C excluding the power unit 22 are connected to each other by a bus 23.

The GPS unit 19A receives GPS signals from GPS satellites, calculates position information (latitude/longitude information) in a horizontal plane of the portable terminal 10C using pieces of information of the GPS signals, and outputs the thus-detected position information to the CPU 11.

GPS signals coming from the GPS satellites can be received outdoors, and the CPU 11 of the portable terminal 10C executes the first information reading process. Therefore, the portable terminal 10C is used for reading and managing RFID tags 30 attached to outdoor reading subjects.

For example, RFID tags 30 are attached to outdoor water meters, electric power meters, or the like (reading subjects) and a worker (user) carrying the portable terminal 10C reads pieces of information from the RFID tags 30 of the water meters, or the like and manages positions and presence of the water meters, or the like. For another example, in a port or the like, RFID tags 30 are attached to containers (reading subjects) and a worker (user) carrying the portable terminal 10C reads pieces of information from the RFID tags 30 and manages positions and presence of the containers.

In this modification, in the portable terminal 10C, the GPS unit 19A detects position information of the portable terminal 10C. Therefore, marks indicating a reading position and a reading direction of an RFID tag 30 attached to a reading subject that is located in an outdoor facility can be displayed.

Although the above-described embodiment and modifications employ the ROM 15 as a computer-readable medium that is stored with the first, second, or third information reading program, the invention is not limited to such a case. A nonvolatile memory such as a flash memory and a portable recording medium such as a CD-ROM can be used as such a computer-readable medium. A carrier wave can also be used in the invention as a medium which provides the first, second, or third information reading program over a communication line.

The invention is not limited to the portable terminals 10, 10A, 10B, and 10C and the first to third information reading programs according to the above-described embodiment and modifications. For example, at least two of the embodiment and modifications can be combined. Specifically, the second or third information reading process according to the first or second modification may be executed in the portable terminal 10C according to the third modification.

Although in the above-described embodiment and modifications each of the portable terminals 10, 10A, 10B, and 10C is a handy terminal that is equipped with the RFID reader/writer unit 18, the invention is not limited to such a case. Another type of portable terminal may be used such as a PDA (personal digital assistant), a cell phone, or a portable personal computer.

In the above-described embodiment and modifications, the RFID tag 30 encompasses an RFID card (non-contact IC card).

In the portable terminals 10, 10A, 10B, and 10C according to above-described embodiment and modifications, a preview image taken by the imaging unit 20 is displayed on the display unit 14 and marks as pieces of guide information indicating reading position and reading direction, for example, are displayed in the preview image. However, the invention is not limited to such a case. For example, marks as pieces of guide information indicating reading position and reading direction, for example, may be displayed on the display unit 14 in a state that no preview image is displayed thereon. Furthermore, in a state that a preview image is displayed or not displayed, the user may be notified of pieces of guide information indicating reading position and reading direction, for example, by another notification method such as voice output or text display.

Although in the above-described embodiment and modifications position information of the portable terminal 10, 10A, 10B, or 10C is detected by the motion sensor 19 or the GPS unit 19A (position information detector), the invention is not limited to such a case. For example, the position information detector may be implemented by using the wireless communication unit 16 of the portable terminal 10, 10A, 10B, or 10C. More specifically, position information of the portable terminal 10, 10A, 10B, or 10C is detected by trilaration which uses radio waves received from an access point by the wireless communication unit 16.

Although in the above-described embodiment and modifications position information of the portable terminal 10, 10A, 10B, or 10C is detected as two-dimensional position information in a horizontal plane, the invention is not limited to such a case. For example, the position information detector may include an altimeter in addition to the two-dimensional position information detector such as the motion sensor 19 or the GPS unit 19A so as to detect three-dimensional position information of the portable terminal 10, 10A, 10B, or 10C.

Although in the above-described embodiment and modifications the output level of radio waves or an electromagnetic field is not changed during reading by the RFID reader/writer unit 18, the invention is not limited to such a case. For example, if a reading position and a reading direction of the portable terminal 10, 10A, 10B, or 10C cannot be detected even though a position and a direction represented by them are close to a reading position and a reading direction, the output level of radio waves or an electromagnetic field of the RFID reader/writer unit 18 may be increased or the user may be given guide information such as "Change the direction of the portable terminal (RFID tag reading direction)."

Although in the above-described embodiment and modifications the read-out information table 40 contains, for each piece of individual identification information 41, one data of reading position information 42 and one data of reading direction information 43, the invention is not limited to such a case. The read-out information table 40 may contain, for each piece of individual identification information 41, plural data of reading position information 42 and plural data of reading direction information. Marks indicating all pieces of reading position information 42 and marks indicating all pieces of reading direction information 43 may be displayed for one piece of individual identification information 41. And the marks indicating all pieces of reading position information 42 or all pieces of reading direction information 43 may be displayed in different colors; for example, a mark indicating information of latest reading is displayed in red and the other marks are displayed in gray. Furthermore, a reading mark may be added to one of the plural marks (e.g., to information of latest reading at the beginning). If no information is read from the RFID tag 30 for the information of latest reading, the reading mark is added to information of second latest reading.

It goes without saying that the detailed configuration and operation of each of the constituent elements of each of the portable terminal 10, 10A, 10B, and 10C according to the embodiment and its modifications can be modified as appropriate without departing from the spirit and scope of the invention.

Although the embodiment of the invention and its modifications have been described above, the scope of the invention is not limited to them and includes the scope defined by the claims and its equivalents.

What is claimed is:

1. A portable terminal comprising:
   a reader that reads identification information from each of a plurality of RFID tags;
   a position information detector that detects position information of the portable terminal;
   a direction information detector that detects direction information of the portable terminal;
   an imaging unit that obtains a preview image of an area;
   a display unit;
   a storage controller that performs, upon reading of the identification information of each of the plurality of RFID tags by the reader:
      acquisition of a first reading direction of the reader from direction information detected by the direction information detector and a first reading position of the reader from position information detected by the position information detector at the time of the reading of the identification information of each RFID tag, and
      storage, in a storage unit, of (i) the first reading position and (ii) the first reading direction, so as to be correlated with the identification information of the RFID tag for each of the plurality of RFID tags;
   a manipulation unit that receives an input of selecting a plurality of RFID tags as reading subjects; and
   a notification controller that:
      displays the preview image taken by the imaging unit on the display unit,
      acquires a second reading direction of the reader from direction information detected by the direction information detector and a second reading position of the reader from position information detected by the position information detector,
      judges, for each of the reading subjects, whether or not a position corresponding to the first reading position for that reading subject exists inside or outside the area of the preview image, and
      causes display of notification of guide information indicating the first reading position and the first reading direction stored in the storage unit for each of the reading subjects made with respect to the second reading position and the second reading direction, respectively.

2. The portable terminal according to claim 1, wherein the notification controller:
   displays first guide information for each reading subject judged to have the first reading position existing inside the area of the preview image indicating the first reading position of the reader and the first reading direction stored in the storage unit with respect to the second position information detected by the position information detector and the acquired second reading direction, in the preview image at a position corresponding to the first reading position, respectively.

3. The portable terminal according to claim 2, wherein the notification controller displays the first guide information in the preview image at a size corresponding to a depth of a position represented by the first reading position.

4. The portable terminal according to claim 2, wherein the notification controller:
   displays, in the preview image, for each reading subject judged to have the first reading position existing outside the area of the preview image, second guide information indicating that the first reading position exists outside the preview image.

5. The portable terminal according to claim 2, wherein the notification controller:
   calculates a distance between a position represented by the detected second position information and the first reading position stored in the storage unit for each reading subject judged to have the first reading position existing inside the area of the preview image, and
   displays, in the preview image, third guide information indicating an instruction for approaching the first reading position stored in the storage unit if the calculated distance is longer than or equal to a prescribed distance.

6. The portable terminal according to claim 1, wherein the notification controller:
   judges whether or not the detected second position information and the acquired second reading direction correspond to the first reading position and the first reading direction stored in the storage unit, and
   causes the reader to read the RFID tag if a judgment result is affirmative.

7. The portable terminal according to claim 1, wherein the notification controller controls the reader to perform polling for reading the RFID tag.

8. The portable terminal according to claim 1, wherein if the identification information of the RFID tag has been read by the reader, the notification controller stops the notification of the guide information corresponding to the read-out RFID tag.

9. A non-transitory computer program product that is readable by a computer for a portable terminal and that encodes commands to execute computer processing, the computer processing comprising:
- reading identification information from each of a plurality of RFID tags;
- detecting position information of the portable terminal;
- detecting direction information of the portable terminal;
- performing, at the time of a first reading of the identification information of each of the RFID tags,
  - acquisition of a first reading position detected by the position information detection,
  - acquisition of a first reading direction detected by the direction information detection, and
  - storage, in a storage unit, of (i) the first reading position and (ii) the first reading direction information, so as to be correlated with the identification information of the RFID tag for each of the plurality of RFID tags;
- receiving an input for selecting a plurality of RFID tags as reading subjects;
- acquiring and displaying a preview image of an area;
- acquiring a second reading position detected by the position information detection,
- acquiring a second reading direction by the direction information detection,
- judging, for each of the reading subjects, whether or not a position corresponding to the first reading position for that reading subject exists inside or outside the area of the preview image, and
- causing a notification unit to display notification of guide information indicating the first reading position and the first reading direction stored in the storage unit for each of the reading subjects made with respect to the second reading position and the second reading direction, respectively.

10. A portable terminal including a reader which reads information from a plurality of electronic tags, the portable terminal comprising:
- a position acquisition unit that acquires a current position of the portable terminal;
- a storage controller that controls the position acquisition unit to acquire a first current position of the portable terminal at a time of reading first information of each electronic tag by the reader and that stores the acquired first current position of the portable terminal as a first reading position in a storage unit, for each of the plurality of electronic tags;
- a manipulation unit that receives an input selection of a plurality of electronic tags as reading subjects;
- an imaging unit that obtains a preview image of an area;
- a display unit that displays the preview image of the area;
- an identification unit that
  - (a) compares (i) a second current position newly acquired by the position acquisition unit at a time of reading second information of the electronic tag of each of the reading subjects with (ii) the first reading position which was stored in the storage unit at the time of reading the first information of the electronic tag for each of the reading subjects,
  - (b) identifies, based on a result of the comparison, a position corresponding to the reading position information for each of the reading subjects with respect to the second current position, respectively; and
  - (c) judges, for each of the reading subjects, whether or not the position corresponding to the first reading position for that reading subject exists inside or outside the area of the preview image; and
- a guide output unit that outputs guide information to the display unit indicating the first reading position identified by the identification unit of each reading subject judged to exist within the area of the preview image, and a notification of each reading subject judged to exist outside the area of the preview image.

11. A portable terminal including a reader which reads information from a plurality of electronic tags, the portable terminal comprising:
- a position acquisition unit that acquires a current position of the portable terminal;
- a direction detector that detects direction information indicating a direction in which the portable terminal faces;
- a storage controller that controls the position acquisition unit to acquire first position information of the portable terminal at a time of reading first information of each electronic tag by the reader and that stores the acquired first position information of the portable terminal so as to be correlated with identification information of the electronic tag for each of a plurality of electronic tags;
- a manipulation unit that receives an input of selection of a plurality of electronic tags as reading subjects;
- an imaging unit that obtains a preview image of an area;
- a display unit that displays the preview image of the area;
- a judging unit, and
- a guide output unit that:
  - (a) identifies the current position and a current direction of the portable terminal by using the position acquisition unit and the direction detector at a time of guiding a user to positions corresponding to the first position information at which the reader read the first information for each of the reading subjects,
  - (b) judges, for each of the reading subjects, whether or not a position corresponding to the first reading position for that reading subject exists inside or outside the area of the preview image,
  - (c) displays guide position information guiding the user to the respective positions corresponding to the first position information with respect to the current position and the current direction for each of the reading subjects judged to exist inside the area of the preview image, and
  - (d) displays notification information indicating each reading subject judged to exist outside the area of the preview image.

* * * * *